United States Patent [19]

Manning et al.

[11] 4,396,926
[45] Aug. 2, 1983

[54] STRIP CHART RECORDER

[75] Inventors: George H. Manning, Nashua; Pasquale R. Riccio, Salem, both of N.H.

[73] Assignee: MFE Corporation, Salem, N.H.

[21] Appl. No.: 343,377

[22] Filed: Jan. 27, 1982

[51] Int. Cl.³ .................... G01D 15/00; G01D 15/24
[52] U.S. Cl. .................................... 346/145; 346/136
[58] Field of Search .............................. 346/145, 136

[56] References Cited

U.S. PATENT DOCUMENTS

| | | | |
|---|---|---|---|
| 1,962,311 | 6/1934 | Knobel | 346/136 UX |
| 2,671,710 | 3/1954 | Bowditch | 346/136 X |
| 3,341,858 | 9/1967 | Loubier | 346/145 X |
| 3,731,318 | 5/1973 | Dickey | 346/145 |
| 4,253,104 | 2/1981 | Paulsen | 346/145 |

Primary Examiner—Donald A. Griffin
Attorney, Agent, or Firm—Cesari and McKenna

[57] ABSTRACT

A chart recorder has all of its components mounted in a housing formed of a self-lubricating plastic material. The unit employs a single drive roller which is driven through a speed-reducing gear train by a low-torque motor and belt drive, which produces minimal noise. A special tilt plate is mounted behind the drive roller. The recorder has a swing-down front door which is movable between an open paper-roll-loading position, an intermediate paper-feed position and a closed operating position. When the door is in its paper-feed position, paper drawn from the roll can be fed manually between the roller and the tilt plate so that the recorder can be threaded up without power. When the door is closed, it resiliently biases the tilt plate against the paper trained around the drive roller so that, when the drive train is energized, the paper is advanced promptly and smoothly. A simple wire bail and cam surface locks the door in its intermediate and closed positions while simultaneously raising the recorder stylus.

22 Claims, 5 Drawing Figures

STRIP CHART RECORDER

This invention relates to a recorder. It relates more particularly to a so-called strip chart recorder which records data on a strip of chart paper as a trace or waveform.

BACKGROUND OF THE INVENTION

Recorders of this general type usually comprise a housing having a swing-out door hinged to the housing. A stylus or pen driven by a galvanometer or torque motor is mounted in the housing with the stylus engaging a bearing surface on the housing. The door can be opened to permit a roll of paper to be inserted into the housing. The paper is drawn from the roll and trained around the bearing surface under the pen and thence leads out of the housing by way of driven rollers. The rollers are driven at a constant rate, while at the same time the torque motor responds to the signal to be recorded and drives the pen back and forth over the paper thereby imprinting a data trace on the paper. The recorder disclosed in U.S. Pat. No. 4,253,104 is typical of prior apparatus of this general type.

In order for the trace to be accurate, it is essential that the paper movement through the recorder be smooth and uniform. To accomplish that objective, conventional recorders have tended to be unduly complex and costly, employing expensive high-torque drive motors with integrated gear trains and numerous bushings and bearings on the moving parts of the recorder. The drive motors commonly used for this purpose are not only expensive, but also they are relatively noisy so that, when a large number of such recorders are operated in a confined space, they present a noise problem.

The prior recorders typified by the one in the aforesaid patent are disadvantaged also in that when loading a new roll of paper into the recorder, the recorder itself must advance the chart paper along the flow path through the recorder. This requires the operator to insert the paper roll into the recorder, feed the leading edge of the paper strip through the recorder until that edge touches the drive rollers and then turn on the recorder's drive mechanism so that the drive rollers engage the strip and advance the leading end out of the recorder. Since in some applications the paper roll must be replaced relatively often, the total reloading downtime involved can be considerable.

Other disadvantages of prior conventional strip chart recorders include the rewinding of the exiting end of the paper strip into the recorder, the inability to tear the exiting paper strip in both upward and downward directions and a relatively complicated pen lift and carriage locking mechanism.

SUMMARY OF THE INVENTION

Accordingly, the present invention aims to provide an improved strip chart recorder.

Another object of the invention is to provide a strip chart recorder which is quite inexpensive as compared with comparable conventional units.

A further object of the invention is to provide a recorder of this general type whose parts can be fabricated and assembled relatively quickly by relatively unskilled personnel.

A further object of the invention is to provide a strip chart recorder that allows the user to manually feed the chart paper along the entire paper flow path through the unit during reloading.

Another object is to provide a recorder with a paper drive which becomes positive on the paper only when power is fed to the unit.

Yet another object of the invention is to provide a recorder of this type which operates quite quietly.

A further object of the invention is to provide a strip chart recorder which requires essentially no bushings or bearings for its rotating parts.

Another object of the invention is to provide a recorder which prevents the exiting end of the paper strip from winding back into the recorder and which permits that end to be torn from the remainder of the strip inside the recorder in either an upward or a downward direction.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present recorder comprises a housing composed of two parts, each of which is molded of a suitable rugged, impact-resistant plastic material. The front of the housing per se is open and it is selectively closed by a swing-down plastic door hinged to the lower edges of the two housing halves. The door is formed with an integral arbor for positively supporting a roll of chart paper. This permits the open door to hang down vertically so that it does not project out appreciably from the recorder housing so as to present an obstacle to passersby.

A conventional torque motor is mounted vertically in the housing with its armature connected to a horizontally oriented stylus or pen. The torque motor responds to the signal being monitored by moving the stylus back and forth horizontally along a bearing surface at the upper edge of the closed door. A wire bail mounted at the top of the housing extends under the stylus. When the door is swung to its closed position, a cam thereon engages and lifts the bail which, in turn, lifts the stylus so that the bearing surface on the door clears the stylus, whereupon the stylus is lowered onto that surface.

The present recorder includes only a single roller for advancing the chart paper over the bearing surface and along the paper feed path out of the recorder. That roller is driven by a single small DC electric motor. The motor armature is connected by a belt to a simple speed reducing drive train which is, in turn, geared to the drive roller.

A special tilt plate is mounted adjacent the drive roller. When the housing door is open as when loading a new paper roll into the recorder or when the door is in an intermediate or so-called paper feed position which is set by the cam on the door, the tilt plate is spaced from the drive roller. Also in that position, the stylus is supported by the bail above the bearing surface at the top of the door. Thus when feeding a new roll of paper into the recorder, the roll is positioned on the door arbor when the door is in its open position and a short length of paper is drawn from the roll. Then the door is closed to its paper feed position which automatically engages the paper around the paper bearing surface on the door. Also in this position, additional paper can be drawn from the roll and advanced by hand into an upper transverse slot in the door and thence between the drive roller and the tilt plate spaced therefrom and out through a narrow transverse slot at the bottom of the door.

Thus the user can put a fresh roll into the recorder and position it for recording without ever having to turn on the recorder's drive mechanism. After the chart paper is fed through the recorder, the user pushes the door to its fully closed position. In that position, the door engages the tilt plate causing that plate to swing toward the underside of the drive roller and resiliently engage the segment of the paper between the drive roller and the plate. Also, when the door is moved to its fully closed position, the cam on the door lowers the bail so that the stylus engages the paper trained over the bearing surface at the top of the door readying the recorder for operation.

As soon as the recorder's drive motor is turned on, the drive roller draws paper from the roll and feeds it out through the slot in the door. The juxtaposition of the tilt plate to the drive roller is such that as soon as the drive roller rotates, the motion of the roller and the paper urges the plate even more firmly into contact with the paper thus assuring a smooth uniform paper travel through the unit as soon as the motor is turned on. By the same token, when the drive motor is turned off and the drive roller stops turning, the tilt plate relaxes its grip on the paper. This aspect is of importance when the drive roller is fitted with a lengthwise series of rubber tires which actually engage the paper. If the grip of the plate were not relaxed as aforesaid, the stationary tires might tend to compress the paper thereat thereby forming small deformations or dents which might inhibit the initial prompt advance of the paper when the recorder is next turned on.

As long as the drive roller turns, the chart paper is advanced past the stylus and out through the slot in the door. The stylus, in turn, is moved back and forth along the bearing surface in response to the electrical signals representing the data being recorded, thereby forming a distinct trace on the chart paper. It is noteworthy that, in the present recorder, the chart paper exits the unit through a narrow slot whose opposite edges function as tearbars permitting the user to tear off the exited strip segment either in an upward direction or a downward direction. This contrasts with prior units of this general type which only have a tearbar below the strip requiring the user to tear in a downward direction often contrary to preference.

Since the paper advancing through the recorder is drawn from a relatively small diameter roll, the leading end segment thereof tends to curl back on itself. To assure that the paper feeds properly through the recorder when being loaded initially and to assure proper paper flow during operation, a stripper bar is molded into the door. When the door is closed, the bar, now located directly opposite the drive roller, eliminates any chance of paper rewind during the feeding and advancing of the paper.

A special motive means is employed to rotate the drive roller. Instead of employing the high-torque drive motor with an integral gear train that is conventionally used in recorders of this type, applicants utilize an inexpensive low-torque DC drive motor which is connected via a belt and pulley to a speed-reducing gear train geared to the drive roller. The belt acts as a filter which prevents motor noise from being transmitted to the gear train. Furthermore, the gear and belt drive mechanism is designed with a ratio that provides smooth, quiet power transmission so that the recorder emits a minimum amount of noise.

Also, the belt drive helps to relieve the pressure of the tilt plate on the paper when the recorder stops. More particularly, when the motor stops, the belt segment on the pulling side of the drive roller tends to relax to some extent. This causes the drive roller to rotate in the opposite direction momentarily which is sufficient to release the tilt plate from its tight engagement with the paper and the drive roller. Resultantly, there is little likelihood of the paper becoming creased or dented by the roller when the recorder is inactive for a prolonged period.

All of the aforesaid features combine to produce a strip chart recorder which is unusually small and compact and unusually inexpensive to manufacture and assemble while still providing superior operating results. Therefore, it should find wide application in situations where it is necessary to record various types of data as traces or waveforms.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
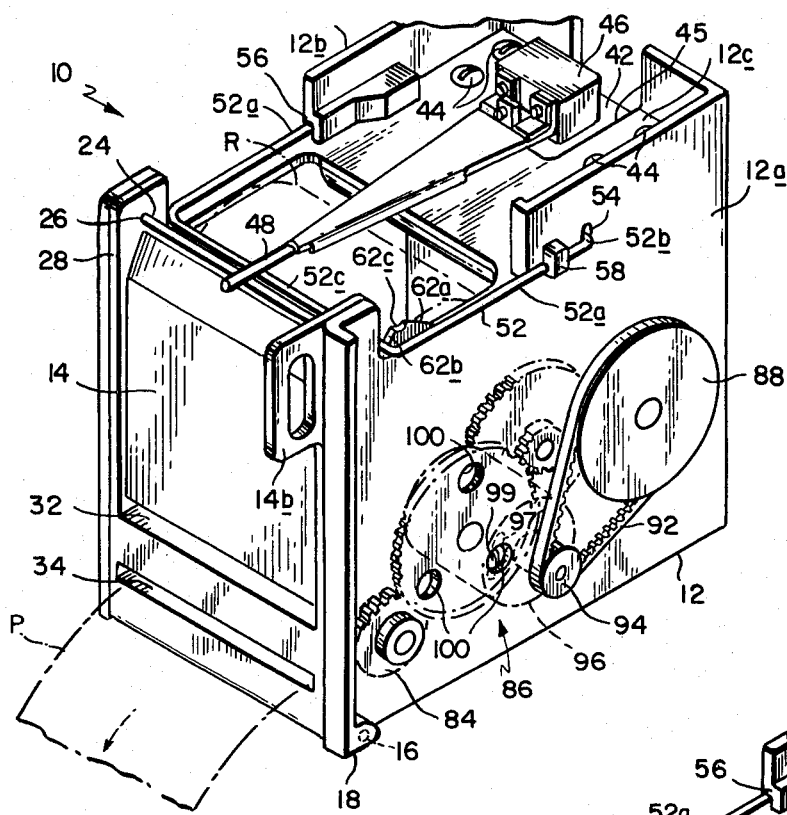
FIG. 1 is an isometric view of a strip chart recorder made in accordance with this invention with the recorder being shown in its operating condition.
Figure 2:
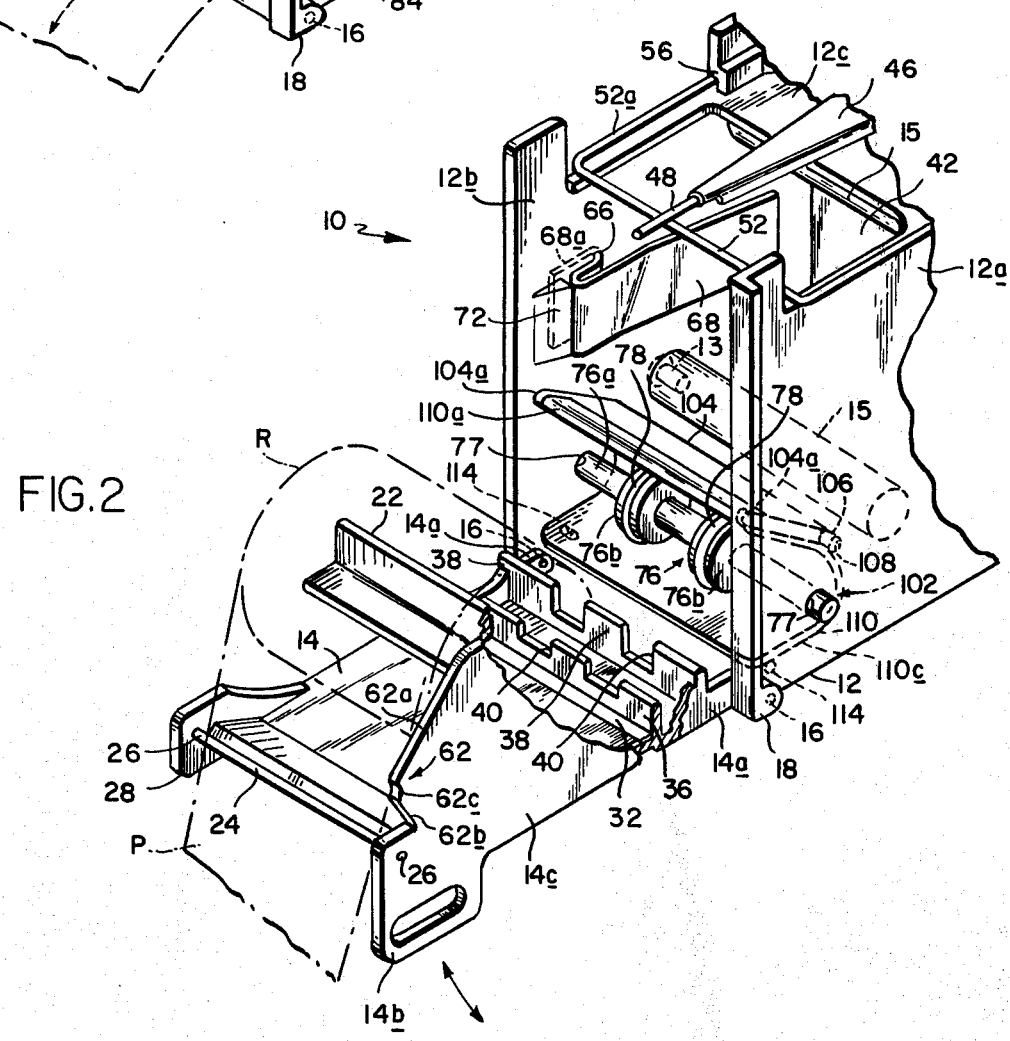
FIG. 2 is a fragmentary isometric view of the FIG. 1 recorder with the recorder door shown in its open or paper loading position.
Figure 3:
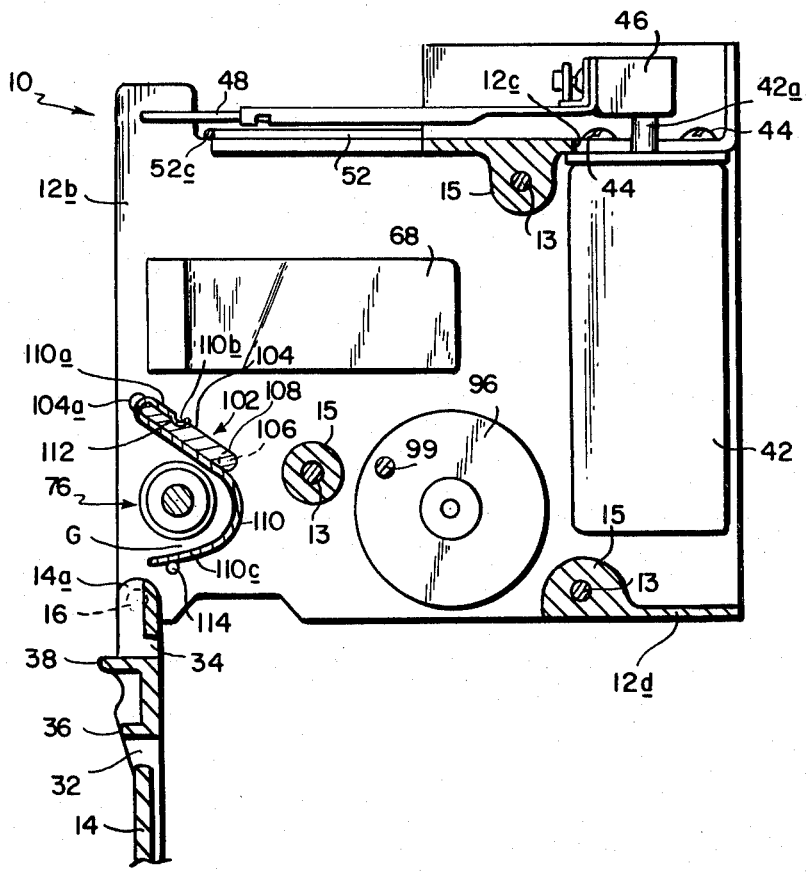
FIG. 3 is a sectional view thereof.

Referring to FIGS. 1 to 3 of the drawings, the strip chart recorder is indicated generally at 10. It comprises a box-like housing 12 composed of a right-hand section 12a and a left-hand section 12b. Each section is molded of a suitable impact-resistant plastic material such as polytetrofluorethylene-impregnated (e.g. 15%) polycarbonate. Section 12a includes a housing top wall 12c and a partial bottom wall 12d (FIG. 3). Most of the internal components of the recorder are assembled in section 12a and then the remaining section 12b comprising more or less just the left-hand wall of the housing is secured to section 12a by threaded fasteners 13 extending through appropriate openings (not shown) in section 12b and turned down into registering openings formed in standoffs 15 formed in section 12a.

Referring now to FIGS. 1 and 2, the front of the housing 12 is closed by a swing-down door 14. The door which is also a molded plastic part has a pair of tabs or ears 14a (FIG. 2) extending from its lower corners. These tabs are connected by pins 16 to a pair of bosses 18 formed at the lower front corners of housing sections 12a and 12b. The door is swingable between a closed or operating position illustrated in FIG. 1 and an open or paper-loading position shown in FIG. 3. In its fully open position, the door hangs straight down from housing 12. In FIG. 2 for drawing space reasons, that door is shown only partially open. The door 14 is conveniently moved between its two positions by a handle 14b located at the upper right-hand corner of the door.

Figure 4:
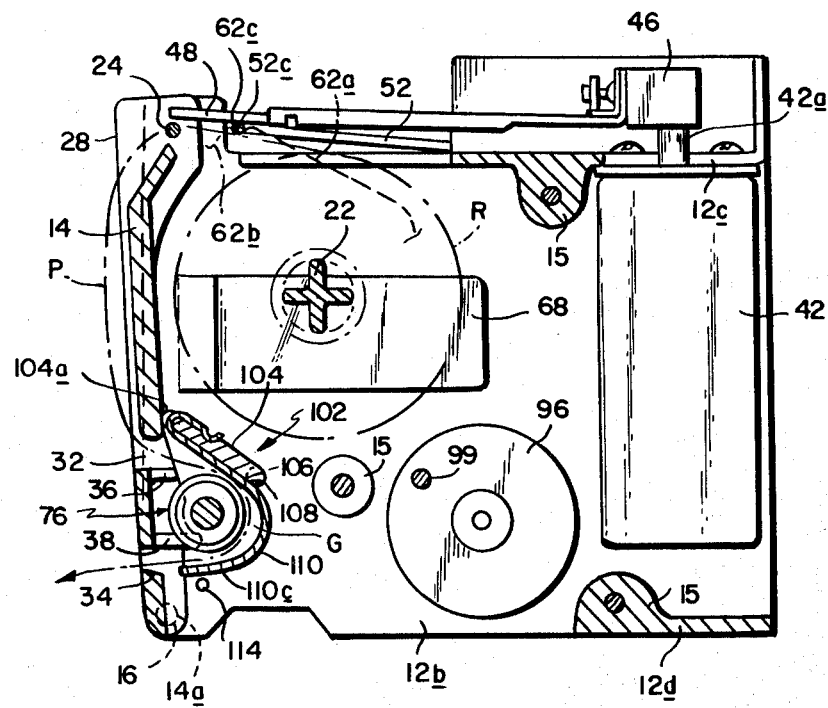
FIG. 4 is a similar view showing the recorder with its door in its partially closed or paper feed position.

Referring to FIG. 2, the door 14 also has a right-hand sidewall 14c. Molded integrally to that wall is a laterally extending shaft or arbor 22 for supporting a roll R of chart paper P. As best seen in FIG. 4, the arbor 22 has a cross-sectional shape in the form of a cross so that it firmly supports the roll core, yet requires a minimum amount of plastic material. A small diameter rod 24 is positioned at the top of door 14, the ends of the rod being received in small openings 26 in door handle 14b and in an ear 28 located directly opposite the handle. Rod 24 constitutes a bearing surface for the recorder paper and stylus.

Referring to FIGS. 1 and 2, the door 14 is formed with a pair of upper and lower horizontal slots 32 and 34. Slot 34 is located adjacent the roots of ears 14a, while slot 32 is positioned slightly above slot 34, e.g. about three-quarter inch. Also as best seen in FIG. 2, formed integrally with the door are a pair of upper and lower horizontal stripper bars 36 and 38. Bar 36 is located adjacent the lower edge of slot 32 while bar 38 is positioned along the upper edge of slot 34. Both bars project out from the inner surface of the door, with bar 38 being somewhat higher than bar 36. Both bars have a pair of registering notches 40. The function of these notched bars will be described later.

Referring now to FIGS. 1 and 3, a galvanometer or torque motor 42 is positioned inside housing 12 at the rear thereof. The motor is mounted to the housing top wall 12c by threaded fasteners 44. The motor armature 42a projects up through an opening 45 in the housing top wall and a conventional recorder armature 46 is mounted to that armature. The armature extends forwardly toward the front of the housing and is terminated by a stylus or pen 48 which is located directly over the door 14 and, more particularly, bearing rod 24 when the door is in its closed position shown in FIG. 1. When door 14 is closed and the recorder is operating, the torque motor 42 receives signals corresponding to the data to be recorded and swings the armature 46 back and forth in a horizontal plane so that the stylus 48 moves back and forth along the rod 24 or, more particularly, the paper P engages over that rod. The illustrated recorder is of the thermographic type. Consequently the stylus 48 is heated by an electric current and the chart paper P has a heat sensitive coating so that it turns brown or black where contacted by the heated stylus 48, thereby forming a dark trace on the paper. The stylus may be of any conventional construction and so need not be described in detail here.

During operation of the recorder, when the door 14 is closed, the stylus 48 swings back and forth along the rod 24 or, more particularly, the paper P trained over that rod. Accordingly, provision must be made for lifting the stylus so that the rod 24 clears the stylus when the door 14 is being closed. In the illustrated recorder as seen particularly in FIGS. 1 and 2, this is accomplished by means of a generally U-shaped wire bail 52 located at the top of housing 12. The opposite arms 52a of the bail extend along the opposite side walls of housing 12. The free ends 52b of those arms are turned inward and project into small openings 54 in the housing side walls. The bail bight 52c extends across the housing at the top thereof below stylus 48. The bail 52 is biased downward by the engagement of its left-hand arm 52a under a laterally extending shelf 56 formed at the top of housing section 12b and the engagement of its right-hand arm 52a under a boss 58 projecting out laterally from the side of housing section 12a. When door 14 is open, bail 52 rests against the upper edges of the housing sections 12a and 12b with the stylus 48 being spaced just above the bail as best shown in FIG. 3.

Referring now to FIG. 2, the door side wall 14c is formed with a cam surface shown generally at 62. The cam surface has a relatively long inclined section 62a, an oppositely-angled relatively steep ramp section 62b and a small notch 62c at the boundary between those two sections. When the door 14 is being closed, as it nears its closed position, the cam section 62a engages the bail 52 and lifts the bail upwards. The bail, in turn, lifts the stylus 48 to a degree that enables the bearing rod 24 on the door to pass under the stylus. Just before the door reaches its fully-closed position, the bail bight 52c seats in the cam notch 62c as shown in FIG. 4. The notch functions as a detent to retain the door in that intermediate or so-called paper feed position which will be described in more detail later in connection with the recorder's paper drive feed mechanism. When the door 14 is pushed further toward its fully closed position, the bail rides up out of the notch 62c and follows the cam ramp 62b downward, thereby lowering the stylus 48 onto the bearing rod 24 to the position shown in FIGS. 1 and 5. It should be appreciated at this point that the armature 46 is somewhat flexible vertically to permit this vertical movement of stylus 48.

As best seen in FIG. 2, a vertical slot 66 is formed in the housing section 12b near the front edge thereof. The slot is arranged to retain a leaf spring 68 whose leading end 68a is bent in the form of an S and inserted through the slot 66. A vertical boss 72 in front of the spring 68 aligns the spring so that, when it is snapped into slot 66, it is automatically positioned substantially horizontally and projects out somewhat into the housing. Thus the spring is in position to bear against the end of the paper roll R when the door 14 is in its intermediate and closed positions shown in FIGS. 4 and 5 respectively. The spring 68 exerts a drag force on the paper roll to prevent the roll from overrunning due to its inertia.

The chart paper P is drawn from roll R over bearing rod 24, in through door slot 32 and advanced out of the recorder through door slot 34 by a drive roller indicated generally at 76 as best seen in FIG. 2. The drive roller comprises an axle 76a whose opposite ends are journaled in openings 77 formed in the opposite side walls of the housing 12. A pair of laterally spaced-apart rollers 76b each carrying a peripheral resilient tire 78 are mounted on the axle at locations directly opposite the notches 40 in the stripper bars 36 and 38. As best seen in FIG. 1, also mounted at the right-hand end of axle 76a beyond housing side wall 12a is a gear 84 which meshes with the last gear of a speed-reducing gear train indicated generally at 86. The first gear in the gear train 86 is rotated by a toothed pulley 88 which is coupled by a toothed belt 92 to a small pulley 94 which is rotated by a small DC electric motor 96 mounted inside the housing.

When the motor 96 is energized, gear 84 and drive roller 76 are rotated in a clockwise direction as seen in FIGS. 1 and 2. The gear ratio of the gear chain 86 is such that a peripheral speed of the drive roller of 25 mm/sec is achieved easily using a very inexpensive low-torque motor 96. Indeed, the cost of motor 96 is an order of magnitude less than the cost of the motors commonly used in recorders of this type typified by the one disclosed in the above identified patent. The utilization of a belt drive for the roller 76 also isolates the noise produced by motor 96. That fact coupled with the ratio provided by the belt drive and gear train assumes that the recorder's drive train operates very quietly. Accordingly, a large number of recorders 10 can be operated in a closed room without producing an excessive amount of noise that might disturb workers in the area.

Referring now to FIGS. 2 and 3, a so-called tilt member shown generally at 102 is positioned in the housing just behind drive roller 76. The member comprises a downwardly-angled, rigid, molded plastic strap 104 extending horizontally across the housing. A pair of laterally extending posts 106 are formed at the opposite ends of the strap adjacent the lower edge thereof. These posts project into small openings 108 in the opposite walls of housing 12. A resilient curved spring plate 110 is clipped onto strap 104. For this, the upper edge margin 110a of the plate is turned back on itself and engaged over the upper edge of strap 104. The very edge of that plate is creased at 110b with the crease seating in a horizontal groove 112 formed in the upper surface of the strap as best seen in FIG. 3. The seating of the crease in the groove securely retains the plate on the strap. Relative lateral movement of those two parts is prevented by nubs 104a which project up at opposite ends of the strap beyond the ends of plate 110.

The tilt member 102 including the strap 104 and plate 110 can thus pivot or tilt to a limited extent on posts 106 and its balance is such that it tends to pivot counterclockwise as viewed in FIG. 2. However, the counterclockwise motion of that member is limited by a pair of bosses or posts 114 which project inward from the opposite side walls of housing 12 below the lower edge margin 110c of plate 110. Normanlly, when the recorder door 14 is open as shown in those figures, the plate 110 rests on those posts 114. In that position, an appreciable space or gap G exists between the drive roller 76 and all surfaces of the spring plate 110 as best seen in FIG. 3. When the door 14 is moved to its intermediate or paper feed position shown in FIG. 4, the door engages the nubs 104a of strap 104 and pivots member 102 clockwise to some extent. However, an appreciable gap G still exists between drive roller 76 and the surfaces of the spring plate 110 as shown in FIG. 4.

Figure 5:
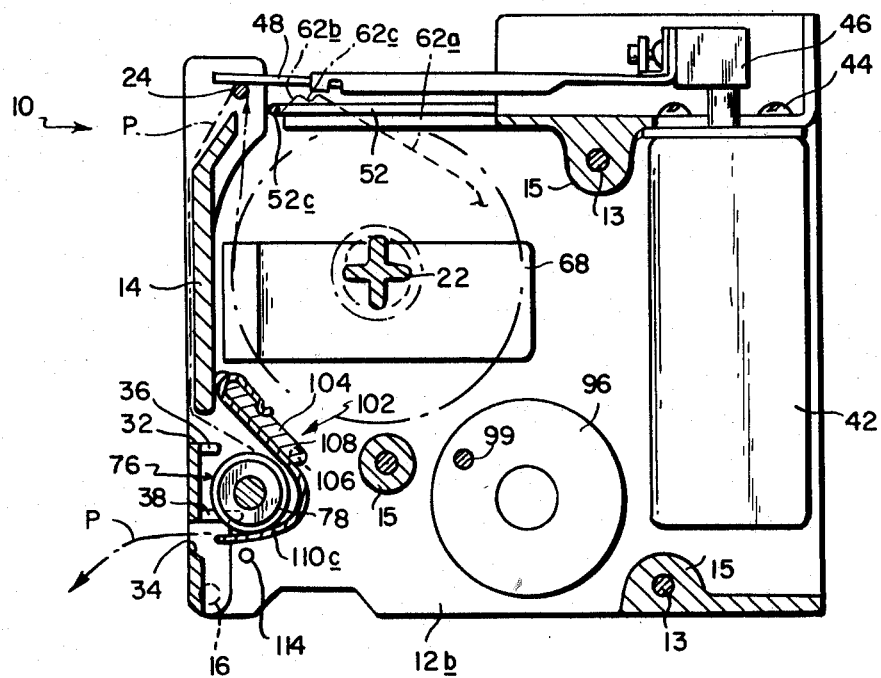
FIG. 5 is a similar view showing the recorder with its door in the fully closed, operating position.

However, when the door 14 is moved to its fully closed or operating position illustrated in FIGS. 1 and 5, the engagement of the door against the strap 104 tilts the strap as well as the spring plate 110 clockwise to such an extent that, while there is clearance between the drive roller and the upper surfaces of the spring plate 110, the lower edge margin 110c of the spring plate is resiliently biased against the underside of the drive roller 76.

In order to use the recorder 10, the door 14 is opened, a roll R of chart paper is positioned on arbor 22 and a length of paper P is drawn from the roll over the bearing rod 24 as shown in dotted lines in FIG. 2. Then the door 14 is swung to its intermediate or paper feed position illustrated in FIG. 4. As the door approaches that position, the cam surface 62a engages bail 52 and lifts the bail which thereupon raises stylus 48 so that the stylus is clear of the bearing rod 24. The seating of the bail 52 in the cam notch 62c retains the door in its paper feed position. The leading end of the paper P can now be fed manually in through the door slot 36 into the gap between the drive roller 76 and the spring plate 110. The leading end of the paper will automatically follow the contour of the spring plate 110 around past the lower edge margin 110c of that plate and out through the lower door slot 34. The stripper bars 36 and 38 assure that the leading end of the paper follows plate 110 and does not curl around the drive roller or wind back into the housing through slot 32.

After pulling the leading end of the paper downward to some extent to draw the paper against the outer surface of the door 14, the user pushes the door to its closed position illustrated in FIGS. 1 and 5. That movement of the door enables the bail 52 to cam pump 62b down against the top of the housing, thereby lowering the stylus 48 onto the bearing rod 24 or, more accurately, onto the paper P trained around that rod. At the same time, the door engages the strap 104 and tilts the strap and the spring plate 110 clockwise to such an extent that the spring plate flexes as its lower edge margin 110c resiliently engages the chart paper segment extending around the underside of the drive roller 76. Thus, that segment of the chart paper is sandwiched between the spring plate and the resilient tires 78 on the drive roller. Thus, the paper P can be fed into position without ever having to turn on the recorder's drive mechanism.

When motor 96 is energized, the drive roller 76 rotates clockwise as viewed in FIG. 5. The initial movement of the drive roller and paper exerts a leftward force on the spring plate margin 110c which tends to pivot the tilt member 102 even further in the clockwise direction. That, in turn, causes the spring plate 110 to engage the paper even more positively. Resultantly, as soon as the drive train is started, the grip on the paper becomes so positive and strong that starting friction and roll inertia are immediately overcome with the result that the paper P advances promptly and smoothly through the recorder. Once the paper advance has commenced, the stylus 48 can be heated and the data signal applied to the torque motor 42. The motion of the torque motor causes the stylus to swing back and forth on the paper advancing around the bearing rod 24 thereby forming a visible trace on the chart paper. Since the paper exits the recorder through the narrow slot 34, when it is desired to examine the trace, the leading edge margin of the paper outside the recorder can be torn off against either the upper or lower edge of that slot. This is advantageous since users usually have a definite preference for the tearing direction.

If the recorder should be stopped for any reason, the pulling force of the paper against the spring plate segment 110c ceases with the result that the spring plate relaxes to a small degree and reduces the gripping force on the paper. This reduction of such force on the paper is also enhanced to some degree by the drive belt 92. More particularly, the belt tends to relax when the driving torque of the motor 96 ceases with the result that it moves the gear train 86 very slightly in the reverse direction causing the drive roller 76 to back up to a very small degree. This motion tends to push the spring plate edge margin 110c away from the drive roller. Both of these factors thereby reduce the compressive force of the tires 78 on the chart paper engaged around them. Consequently, there is minimal tendency of the paper becoming creased or dented by the tires when the recorder is inactive for a prolonged period. Still, when the recorder is next started, the drive roller will again positively engage the paper so that it advances immediately and smoothly assuring an accurate trace on the paper.

As seen from the drawing figures, all of the rotary components of the recorder are journaled right in the walls of housing 12. No bushings or bearings are required because the housing is formed of a polycarbonate impregnated with 15% polytetrafluorethylene which is a self-lubricating material. Further, the mechanism for maintaining the recorder door in its intermediate and closed positions and for raising and lowering the stylus comprises simply a wire bail and a cam surface. This is the ultimate in simplicity. The remaining components of the recorder such as the paper roll spring 68 and the two parts of the housing itself are likewise simply made and assembled. Therefore, the overall cost of the recorder 10 is quite low as compared with prior comparable devices of this type.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

What is claimed as new and desired to be secured by Letters Patent of the United States is:

1. A strip chart recorder comprising
    A. a housing having spaced-apart side walls and an open front;
    B. a swing-down door hinged to the front of the housing and movable between
        (1) an open position providing access to the interior of the housing; and
        (2) a closed position wherein the door covers the opening into the front of the housing;
    C. means for supporting a roll of paper;
    D. a paper-bearing surface at the upper edge of the door;
    E. means in the housing for advancing a strip of paper from a roll mounted on the roll-supporting means over said bearing surface and out of the housing at a selected rate;
    F. a pen motor mounted in the housing;
    G. a pen mechanically coupled to the motor and movable across the bearing surface;
    H. means for moving the pen away from the bearing surface when the door is moved between its open and closed positions, said moving means including
        (1) a bail having a pair of arms and an intervening bight;
        (2) means for fastening the arms to the housing so that the bail bight extends under the pen; and
        (3) a cam formed on the door, said cam being profiled so as to engage and lift the bail which in turn lifts the pen clear of the bearing surface when the door is moved between its open and closed positions.

2. The recorder defined in claim 1 wherein said cam is further profiled to be resiliently engaged by the bail when the door is in its closed position, thereby releasably retaining the door in that position.

3. The recorder defined in claim 1 wherein the roll supporting means comprise a post mounted laterally to the inside wall of the door.

4. The recorder defined in claim 3 and further including a leafspring removably retained in a side wall of the housing adjacent the front thereof to apply a drag on a paper roll mounted to the roll-supporting means.

5. The recorder defined in claim 1 wherein the advancing means comprise
    A. a roller mounted near the front of the housing for rotation about an axis parallel to the bearing surface;
    B. means supported by the housing for rotating the roller;
    C. nip-forming means movably mounted to the housing, said nip-forming means
        (1) being spaced from the roller when the door is in its open position; and
        (2) being moved by the door into resilient engagement with said roller when the door is moved to its closed position.

6. The recorder defined in claim 5 wherein the nip-forming means comprise a resilient curved plate
    A. extending around just behind the roller; and
    B. pivotally mounted to the housing side walls.

7. The recorder defined in claim 5 and further including a surface formed in the cam for releasably retaining the bail when the door is ajar in a so-called paper feed position so that
    A. the door remains partially open;
    B. the pen remains elevated above the bearing surface; and
    C. the nip-forming means remains spaced from the roller.

8. The recorder defined in claim 7 and wherein the cam is further profiled to be resiliently engaged by the bail when the door is in its closed position, thereby releasably retaining the door in that position.

9. The recorder defined in claim 5 wherein the rotating means comprise
    A. an electric motor having an armature; and
    B. means including a belt drive for coupling rotary motion from the armature to the roller.

10. The recorder defined in claim 9 wherein the coupling means comprise
    A. a first pulley mounted to the motor armature;
    B. a gear train having a plurality of gears in mesh;
    C. a second pulley rotatively coupled to the first gear in the gear train;
    D. an endless belt rotatively connecting the first and second pulleys; and
    E. means for rotatively coupling the last gear in the gear train to the roller.

11. The recorder defined in claim 1 wherein the roller comprises
    A. an axle; and
    B. a plurality of wheels spaced along the axle.

12. The recorder defined in claim 11 and further including a resilient tire on each of the wheels.

13. A strip chart recorder comprising
    A. a housing having spaced-apart side walls and an open front;
    B. a swing-down door hinged to the front of the housing and movable between
        (1) an open position permitting access into the housing; and
        (2) a closed position wherein the door covers the opening into the front of the housing, said door also being movable to an almost-closed paper feed position;
    C. means for supporting a roll of paper horizontally at the inside surface of the door;

D. a paper-bearing surface formed at the upper edge of the door;
E. writing means movable along the bearing surface;
F. a first horizontal slot formed in the door;
G. a second horizontal slot formed in the door closer to the door hinge than the first slot;
H. a drive roller rotatively mounted horizontally in the housing side walls generally opposite said slots when the door is in its closed position;
I. paper path-defining means movably mounted to the housing adjacent to the roller, whereby
   (1) when the door is in its paper feed position, the leading edge of paper from a roll mounted on the supporting means can be drawn by hand over the bearing surface and advanced into the first slot whereupon it follows a path between the path-defining means and the roller and passes out through the second slot; and
   (2) when the door is in its closed position, it engages and moves the path-defining means against the roller so that the paper is resiliently engaged in a nip formed between the path-defining means and the roller;
J. means for releasably retaining the door in its paper feed and closed positions; and
K. means for rotating the roller when the door is in its closed position so that the paper from the roll is automatically drawn over the bearing surface, in through the first slot, through said nip and advanced out through the second slot at a selected rate.

14. The recorder defined in claim 13 wherein the paper-bearing surface comprises a small diameter rod mounted horizontally at the upper edge of the door.

15. The recorder defined in claim 13 wherein the drive roller comprises
   A. an axle; and
   B. a plurality of wheels spaced along the axle for resiliently engaging the paper.

16. The recorder defined in claim 15 and further including tabs projecting from the inner surface of the door between the wheels when the door is in its closed position to prevent the leading edge of the paper from following an incorrect path through the recorder.

17. The recorder defined in claim 13 wherein the path-defining means comprises a curved plate
   A. pivotally connected to the housing side walls;
   B. extending behind the roller approximately from the first slot to the second slot when the door is in its closed position;
   C. being spaced from the roller when the door is in its paper feed position; and
   D. resiliently engaging the roller when the door is in its closed position at a location on the plate below its pivotal connection to the housing side walls and below the rotary axis of the roller.

18. The recorder defined in claim 17 wherein the roller is rotated by the rotating means so that, when the door is in its closed position, the periphery of the roller tends to tilt the plate into ever firmer resilient engagement with the roller.

19. The recorder defined in claim 13 wherein the retaining means comprise
   A. resilient detent means mounted to the housing; and
   B. a cam formed on the door, said cam having
      (1) a first cam surface resiliently engaged by the detent means when the door is in its paper feed position; and
      (2) a second cam surface resiliently engaged by the detent means when the door is in its closed position.

20. The recorder defined in claim 19 wherein
   A. the detent means comprise a bail having its arms secured to the housing side walls so that its bight extends under said writing means; and
   B. the cam is profiled so that it engages and lifts the bail which, in turn, lifts the writing means clear of the bearing surface when the door is moved to its paper feed position from either its open or closed position.

21. The recorder defined in claim 13 wherein the rotating means comprise
   A. an electric motor having an armature;
   B. a roller gear fixed to rotate with the roller;
   C. a speed-reducing gear train, the last gear of said train being in mesh with the roller gear; and
   D. belt and pulley means for coupling rotary motion from the motor armature to the first gear in the gear train so as to minimize transmission of vibrations from the motor to the gear train.

22. The recorder defined in claim 21 wherein the belt in the belt-and-pulley means is resilient.

* * * * *